(12) United States Patent
Hyland et al.

(10) Patent No.: US 11,068,740 B2
(45) Date of Patent: Jul. 20, 2021

(54) PARTICLE BOUNDARY IDENTIFICATION

(71) Applicant: MALVERN PANALYTICAL LIMITED, Malvern (GB)

(72) Inventors: James Hyland, Malvern (GB); Chris Jones, Malvern (GB)

(73) Assignee: Malvern Panalytical Limited, Malvern (GB)

(*) Notice: Subject to any disclaimer, the term of this patent is extended or adjusted under 35 U.S.C. 154(b) by 0 days.

(21) Appl. No.: 16/330,406

(22) PCT Filed: Sep. 1, 2017

(86) PCT No.: PCT/EP2017/072016
§ 371 (c)(1),
(2) Date: Mar. 5, 2019

(87) PCT Pub. No.: WO2018/046407
PCT Pub. Date: Mar. 15, 2018

(65) Prior Publication Data
US 2020/0193212 A1 Jun. 18, 2020

(30) Foreign Application Priority Data
Sep. 7, 2016 (EP) .................................. 16187702

(51) Int. Cl.
*G06T 7/12* (2017.01)
*G06K 9/46* (2006.01)
(Continued)

(52) U.S. Cl.
CPC ....... *G06K 9/4609* (2013.01); *G01N 15/1463* (2013.01); *G06K 9/629* (2013.01);
(Continued)

(58) Field of Classification Search
CPC combination set(s) only.
See application file for complete search history.

(56) References Cited

U.S. PATENT DOCUMENTS

| 6,094,508 A * | 7/2000 | Acharya | G06T 7/12 |
| | | | 382/199 |
| 8,965,132 B2 * | 2/2015 | Poyil | G06T 7/13 |
| | | | 382/199 |

(Continued)

OTHER PUBLICATIONS

Canny (Nov. 1986). "A Computational Approach to Edge Detection," IEEE Transactions on Pattern Analysis and Machine Intelligence 8(6): 679-698.

(Continued)

*Primary Examiner* — Cindy Trandai
(74) *Attorney, Agent, or Firm* — Morrison & Foerster LLP

(57) ABSTRACT

A method of characterising particles (140) by using a processor (301) to identify a particle boundary (165) of at least one particle (140) in an image (135, 171). The method comprises processing the image (135, 171) using a thresholding method to determine a first boundary (160a) corresponding with the at least one particle (140) and processing the image (135, 171) using an edge detection method to determine a second boundary (160b) corresponding with at the least one particle (140). The first boundary (160a) and second boundary (160b) are combined to create a combined boundary (160). A particle boundary (165) of the at least one particle (140) is determined using the combined boundary. A parameter used by the edge detection method is adaptive, and determined with reference to the image (135, 171).

16 Claims, 7 Drawing Sheets

(51) Int. Cl.
  *G01N 15/14* (2006.01)
  *G06K 9/62* (2006.01)
(52) U.S. Cl.
  CPC ............... *G01N 2015/1493* (2013.01); *G01N 2015/1497* (2013.01)

(56) References Cited

U.S. PATENT DOCUMENTS

| | | | | |
|---|---|---|---|---|
| 2007/0065009 A1* | 3/2007 | Ni | ........................ | G01S 7/52034 382/173 |
| 2009/0175537 A1* | 7/2009 | Tribelhorn | ............ | G06K 9/3233 382/173 |
| 2011/0075911 A1* | 3/2011 | Xing | ......................... | G06T 7/12 382/131 |
| 2012/0189190 A1* | 7/2012 | Bala | ......................... | G06T 7/187 382/154 |
| 2013/0329052 A1* | 12/2013 | Chew | ................. | G06K 9/00771 348/159 |
| 2014/0119633 A1* | 5/2014 | McCord | .................... | G06K 9/52 382/133 |
| 2014/0233826 A1* | 8/2014 | Agaian | .................... | G06K 9/46 382/133 |
| 2016/0203584 A1* | 7/2016 | Wu | ............................ | G06T 7/11 382/195 |
| 2019/0099159 A1* | 4/2019 | Voigt | ........................ | G06T 7/60 |
| 2020/0027694 A1* | 1/2020 | Wang | ................. | G01N 23/2251 |

OTHER PUBLICATIONS

Duan, D. et al. (2015) "A Review of Active Contour Model Based Image Segmentation Algorithms", Chinese Journal of Biomedical Engineering, 34(4): 445-454. [English Translation of Abstract].

International Search Report and Written Opinion dated Nov. 6, 2017, directed to PCT Application No. PCT/EP2017/072016; 9 pages.

Lee at al. (Feb. 2005). "Integrating Edge Detection and Thresholding Approaches to Segmenting Femora and Patellae from Magnetic Resonance Images," Biomedical Engineering—Applications, Basis & Communications 17(1): 1-11.

Lee, J. (1983). "Digital Image Smoothing and the Sigma Filter", Computer, Vision, Graphics, and Image Processing 24: 255-269.

Otsu, N. (1979). "A Threshold Selection Method from Gray-Level Histograms", IEEE Transactions on Systems, Man, and Cybernetics 9(1): 62-66.

Samopa et al. (Apr. 2009). "Hybrid Image Thresholding Method using Edge Detection," IJCSNC International Journal of Computer Science and Network Security 9(4): 292-299.

Taghizadeh et al. (Jan. 2011). "Bidirectional Image Thresholding Algorithm using Combined Edge Detection and P-Tile Algorithms," The Journal of Mathematics and Computer Science 2(2): 255-261.

* cited by examiner

PARTICLE BOUNDARY IDENTIFICATION

REFERENCE TO RELATED APPLICATIONS

This application is a national stage application under 35 USC 371 of International Application No. PCT/EP2017/072016 filed Sep. 1, 2017, which claims the priority of European Application No. 16187702.2, filed Sep. 7, 2016, the entire contents of which are incorporated herein by reference.

FIELD OF THE INVENTION

The present invention relates to image processing, and more particularly to processing of image data to identify edges of particles.

BACKGROUND OF THE INVENTION

One method for particle characterisation comprises obtaining an image that includes at least one particle, and processing the image to identify and characterise the particle(s). It is necessary to distinguish which parts of the image are the particle(s), and which are not. This problem may be referred to as segmentation, or separating the foreground (the particle or particles) from the background (not particles). The background may include variations in intensity, for example due to noise, or due to variations in illumination intensity.

This problem of separating the foreground from the background, or identifying particle boundaries, may be particularly challenging where there is low contrast between the particle and the background. For example, biopharmaceutical compounds comprising proteins do not typically absorb or scatter a great deal of light (at typical imaging wavelengths) and can be difficult to distinguish from the background with standard microscopy techniques, which result in low contrast images.

Existing segmentation methods include threshold analysis, for example based on Otsu's method (Otsu, Nobuyuki. "A threshold selection method from gray-level histograms." Automatica 11.285-296 (1975): 23-27). This method has a low computational cost, but may not be suitable for segmentation of low contrast particles.

More recently, a family of techniques for segmentation have been developed, termed 'active contours' (Duan, D. Z. H. Q. C. &. X. S., 2015. A review of active contour model based image segmentation algorithms, Chinese Journal of Biomedical Engineering, 34 (4), pp. 445-454). Such techniques pose the segmentation problem as an energy minimising problem. Although capable of effective segmentation, these techniques have two main drawbacks. Firstly, the results are not repeatable as the solution is not unique, since random seeds are typically used. Secondly, the iterative nature of these methods requires some time to run, defined by the complexity of the image and the computing power available. At the current state of the art it is not possible, without considerable investment in computing power, to achieve a solution in a very short time (e.g. a few second, or less than a second).

A solution that makes efficient use of computational resources at the same time as providing good identification of particle boundaries (e.g. in low contrast images) is desired.

SUMMARY OF THE INVENTION

According to a first aspect of the invention, there is provided a method of characterising particles by using a processor to identify a boundary of at least one particle in an image, the method comprising:

processing the image using an intensity based method to determine a first boundary corresponding with the at least one particle;

processing the image using a gradient based method to determine a second boundary corresponding with the at least one particle;

combining the first boundary and second boundary to create a combined boundary;

determining a particle boundary of the at least one particle using the combined boundary.

The combination of intensity based and gradient based methods has been found by the applicant to result in rapid and reliable identification of particle boundaries.

Combining the first boundary and second boundary may comprise using an OR operator.

The method may further comprise determining characteristics of a particle in the image using the particle boundary (for example shape or size, or the distribution of these features over more than one particle).

The method may comprise determining a summary of the characteristics of particles in an image, for example a particle size distribution, or mean and/or median values of parameters relating to shape and size The method may comprise acquiring the image using a camera.

The intensity based method may be any method based on the intensity of the image, for example a thresholding method (e.g. with a pre-defined threshold) or an adaptive thresholding method (in which a threshold is determined or modified based on the image), such as Otsu's method.

The adaptive thresholding method may comprise: measuring a range of intensity in the image; determining a threshold value with reference to a percentage of the range of intensity in the image.

Determining an adaptive threshold may comprise: determining an upper and lower percentile of pixel intensities (or brightness) (e.g. $95^{th}$ and $5^{th}$ percentile respectively). The adaptive threshold may be some percentage of the difference between the upper and lower percentile (e.g. 80% of the difference). In other embodiments, different values may be used. The lower percentile may be a percentile from the 1st to 20th. The upper percentile may be a percentile between the 80th and 99th. The percentage of the difference may be between 60% and 100%.

The gradient based method may be any method that is calculated with reference to an intensity gradient of the image. The gradient based method may be an edge detection method. Suitable gradient based techniques may be based on first or second order gradients of intensity in the image, and may further use any suitable smoothing filter. An example of a specific gradient based method is Canny's edge detector (*Canny, J., 1986. A computation approach to edge detection. IEEE Trans. Pattern Anal. Mach. Intell.,* 8 (6), pp. 769-798), but any other gradient based method may be used, such as: a zero crossing method; a method performed on a gradient determined using a Sobel or Prewitt operator; a watershed method and/or a method comprising determining the Laplacian of Gaussian operator.

The parameters of the gradient based/edge detection method may be adaptive, and determined with reference to the image.

One or more parameter (such as a threshold) of an edge detection method (e.g. for a Canny edge detection method) may be determined with reference to the image. One or both of the dual thresholds used in Canny edge detection may be determined with reference to the image. One or both of the dual thresholds may be adjusted based on image statistics. The image statistics used to adjust (or determine) one or both of the thresholds may be the standard deviation of image intensity (or a multiple thereof).

For example, a low threshold for Canny's method may be determined as a percentage of the standard deviation of image intensity.

In some embodiments, a low threshold may be determined using the following steps: find a difference between the maximum possible image intensity (e.g. 255 for an 8 bit greyscale image) and an upper percentile of the intensity of the image pixels (e.g. the $99^{th}$ percentile).

A high threshold may be determined from the low threshold (e.g. as a predetermined multiple of the low threshold (regardless of how the low threshold is determined).

The method may comprise processing the image with an edge preserving filter. The edge preserving filter may be applied before the first and second segmented image are determined. The edge preserving filter may comprise a sigma filter such as Lee's sigma filter "Digital image noise smoothing and the sigma filter" in Computer Vision, Graphics and Image Processing, vol. 24, 255-269 (1983). This has been found to reduce image noise at the same time as effectively enhancing particle edges, which may aid subsequent steps of processing using intensity and gradient methods to determine the first and second segmented images.

The method may comprise performing a close operation on an image comprising the combined boundary (for instance to fill holes in the boundary due to imperfect detection of a boundary). The close operation may comprise using a 3×3 square structuring element. A close operation may be defined as a dilation operation followed by an erosion operation, where the dilation and erosion operations are performed using the same structuring element (e.g. a 3×3 square). Other structuring elements may be used, for example a 4×4 square or 5×5 square.

According to a second aspect of the invention, there is provided a method of characterising particles by using a processor to identify a particle boundary of at least one particle in a captured image. The captured image is processed to identify image features that correspond with particles (or that are likely to correspond with particles). Regions of interest are identified in the captured image, each region of interest comprising at least one identified feature corresponding with a particle. At least some of the captured image may not be included in any of the regions of interest. At least one image region is extracted from the captured image, each image region being smaller than the captured image and corresponding with a region of interest. At least some of the at least one image region is processed in accordance with the first aspect of the invention to determine the particle boundary of at least one particle.

The method may further comprise correcting for illumination variation by performing a flat field correction (before the step of processing the captured image to identify image features that correspond with particles). The flat field correction may be determined with reference to an illuminated calibration image that does not contain any particles. The flat field correction may be determined with reference to a plurality of illuminated calibration images that may contain particles, the flat field correction using only pixels that are determined as not likely to relate to particles (e.g. based on a threshold intensity).

The flat field correction may further comprise correcting for fixed pattern noise in an imaging detector using a dark image taken with no illumination.

The method may comprise processing the captured image using an edge preserving filter (as discussed above) before processing the captured image to identify features that correspond with particles.

Processing the captured image to identify image features that correspond with particles may comprise applying a threshold operation, to identify image features with a brightness (or intensity) that is less than a threshold value (for a bright field image), or features with a brightness that is greater than a threshold value (for a dark field image). The threshold operation may comprise determining the threshold based on the distribution of brightness found in the captured image. More generally, the threshold may be adaptive and responsive to (or determined with reference to) the captured image. In some embodiments the threshold may be determined with reference to statistical properties of the distribution of brightness (e.g. with reference to a multiple of a standard deviation from a modal or mean value). The same adaptive threshold method described with reference to the first aspect may be applied to identify image features that correspond with particles in the captured image.

Obtaining a sequence of smaller image regions from a captured image and separately segmenting each captured image allows an adaptive threshold criteria to be set based on the specific image region around the particle, which improves the consistency and accuracy of the method, as well as reducing computational overhead. Significant areas of the captured image may not be processed to identify particle boundaries by either the gradient or threshold based method. Regions of the captured image that are not part of an image region (or region of interest) may be discarded without further processing.

In some embodiments, each image region may be subject to a rejection criteria that determines whether the image region is processed according to the first aspect, or not processed (e.g. to remove image regions in which the feature was simply noise, or which are out of focus). The rejection criteria may be based on the range of brightness (or intensity) within the image region, and may be based on a threshold, for instance with each image region having a range of brightness that is less than a threshold value being rejected. The rejection criteria may also be based on statistics like the standard deviation of the intensity. The brightness range may be determined as the difference in brightness between the an upper percentile and a lower percentile of brightness (e.g. $99^{th}$ and $1^{st}$ percentile respectively). The threshold may be a percentage of the upper percentile of brightness (e.g. 1%, or 1% of the $99^{th}$ percentile). The upper percentile in this calculation may be between the 80th and 99th, and the lower percentile between the 1st and 20th. The percentage of the upper percentile may from 1% to 10%.

The captured image may comprise a field of view of an imaging microscope. The method may comprise capturing the image from a camera.

According to another embodiment, an instrument for characterising particles is provided, comprising a processor configured to perform the method of the first or second aspect. A non-volatile machine readable memory (e.g. CD-ROM) may be provided, with instructions for configuring a processor to perform the method of the first or second aspect.

The instrument may comprise a camera configured to obtain an image that includes particles, a processor configured to process the images in accordance with the method and to determine characteristics of the particles in the image (for example their shape or size, or the distribution of these features). The instrument may comprise a screen for displaying the characteristics of the particles to the user.

The instrument may be configured to present an array of thumbnail images to the user, each thumbnail comprising an image region, processed in accordance with an embodiment. The instrument may be configured to present a summary of the characteristics of the particles, for example a particle size distribution, or mean and/or median values of parameters relating to shape and size.

The instrument may be configured to allow a user to alter how the processing of an images is performed to determine particle boundaries. For example, the user may be able to adjust threshold parameters, and/or to select a particular gradient based method.

Each and every feature of each embodiment and/or aspect may be combined with each and every feature of each other embodiment and/or aspect.

BRIEF DESCRIPTION OF THE DRAWINGS

Example embodiments will now be described, with reference to the accompanying drawings, in which.

DETAILED DESCRIPTION OF THE INVENTION

Figure 1:
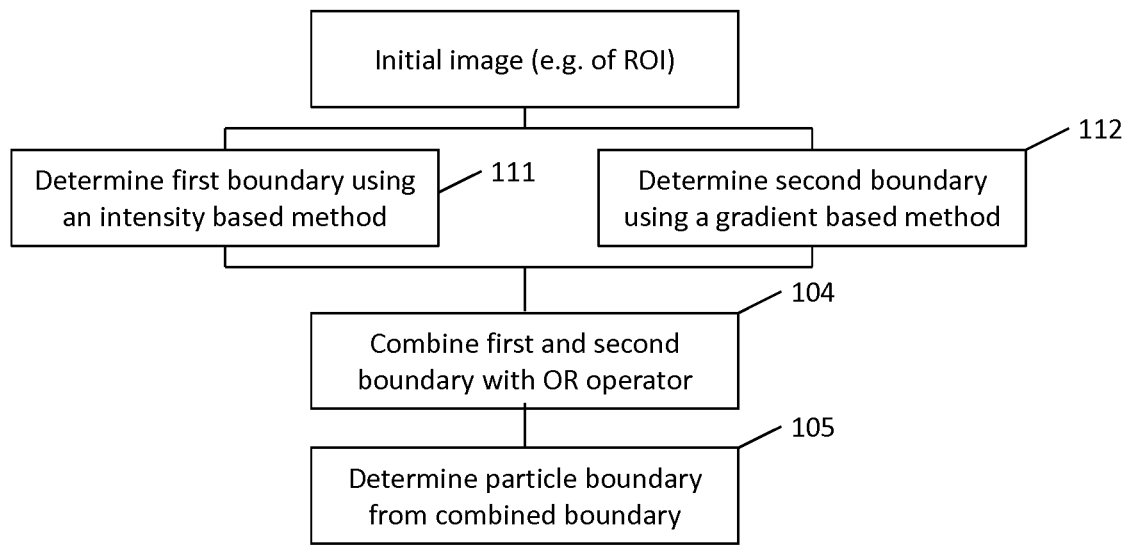
FIG. 1 is a flow diagram of a method according to an embodiment, in which an image is processed to identify a particle boundary.

Referring to FIG. 1, an example method is illustrated. An initial image is the starting point for the method, which may be obtained as a region of interest from a larger image, or may be a frame capture from an image detector.

At step 111, an intensity based method is applied to determine a first boundary. As already discussed an intensity based method is any method that identifies a boundary based on the intensity of the image, such as a thresholding method.

The result of the intensity based method may be used to determine a logical (binarized) image, where each pixel is categorised as 'particle' if 'above' the threshold, and 'not particle' if 'below' the threshold. The term 'above' may mean having a higher intensity value than a threshold intensity in the case of dark field imaging, and may mean having a lower intensity value in the case of light field imaging. The first boundary may be determined from the boundaries of the regions identified as 'particle' in the logical image.

At step 112, a gradient based method is employed to determine a second boundary. The gradient method may be any method calculated with reference to an intensity gradient, as already discussed.

At step 104, a combined boundary is determined by combining the first boundary with the second boundary, in this example using an OR operator. Pixels are added to the combined boundary if they are in the first boundary or the second boundary (or if they are in both). Pixels which are in neither the first nor second boundary will not be included in the combined boundary.

At step 105, a particle boundary is determined from the combined boundary. The combined boundary may be processed to determine the particle boundary, for example to eliminate spurious internal edges, and/or to close small gaps in the boundary (e.g. using a close operation, as discussed above).

Figure 2:
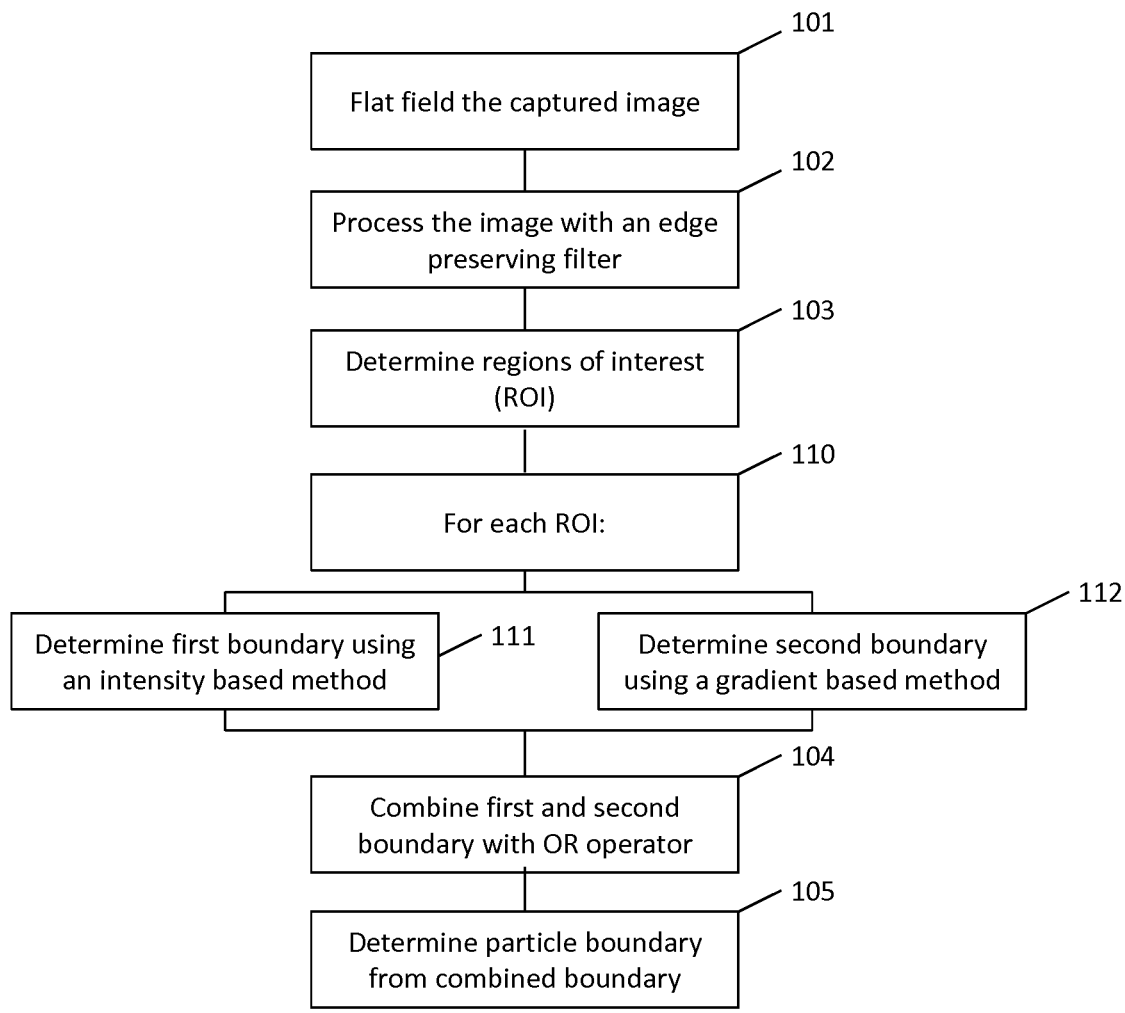
FIG. 2 is a flow diagram of a method according to another embodiment, in which a captured image is processed to first identify regions of interest, and then each region of interest is processed to identify a particle boundary.

Referring to FIG. 2, a method is disclosed for identifying the boundaries of particles in an image frame captured from an imaging detector. In this method, an image frame is first processed to identify regions of interest, and then each region of interest is processed to identify particle boundaries therein.

At step 101, a flat field correction is performed on the captured image. One way to perform a flat field correction is to use a static correction (e.g. with no particles present). A 'blank' image is captured according to the illumination set-up that will be used for the capture of the image to be processed. A dark image, without illumination is generally also used to remove any fixed pattern noise from the detector, but this is not essential.

A corrected image may be determined from the following formula:

$$\text{corrected image} = I_\mu \left( \frac{\text{captured image} - \text{dark image}}{\text{blank image} - \text{dark image}} \right)$$

Where $I_\mu$ is the mean intensity of the captured image.

Alternatively, the flat field correction may be determined dynamically, from a number of frames obtained at or near to the time the image to be processed is captured (for instance, with particles present or flowing through the imaging frame). For example, ten frames may be captured. The more frames that are captured, the more accurate the dynamic flat field correction will be.

Figure 3:
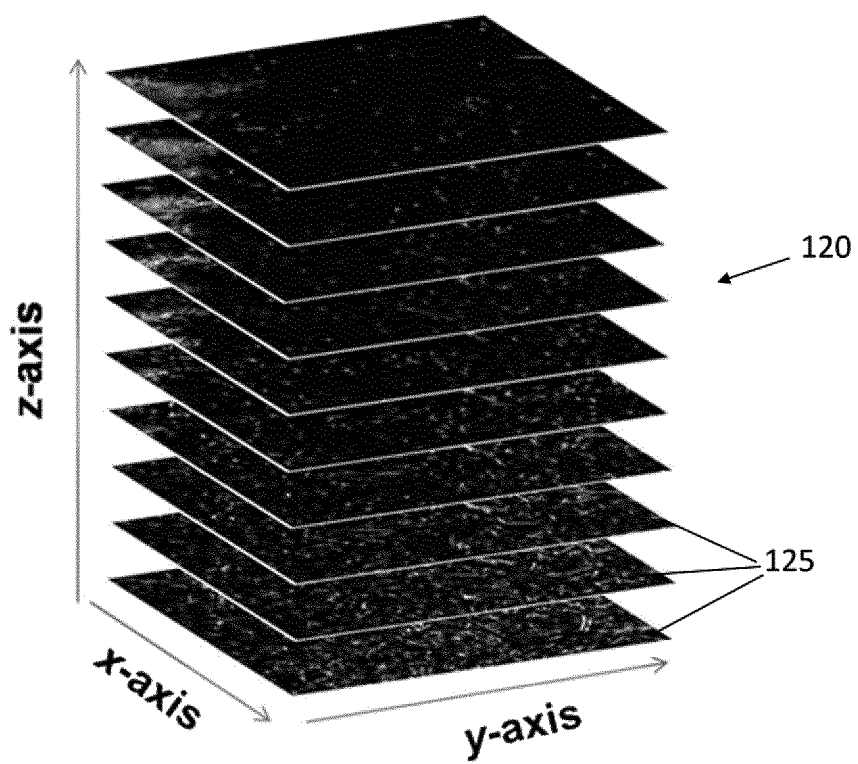
FIG. 3 is a stack of images for use in flat field correction.

FIG. 3 illustrates this, showing a stack 120 of captured frames 125 for use in determining a dynamic flat field correction. The x and y axes are the image dimensions in each frame, and the z axis is frame number.

A dynamic flat field correction may comprise determining the average intensity and standard deviation in the z-direction for each pixel that is not rejected as associated with a particle. This comprises determining the average intensity of the first pixel across each image captured, and so on. In order to determine which pixels are retained and averaged for the flat field correction and which are disregarded, for each pixel position a lower and upper bound may be calculated as the average intensity at each pixel position minus or plus the standard deviation at each position multiplied by some factor e.g.

For all pixel positions

Lower_bound(pixel posn)=average_intensity(pixel posn)−SCALE*$std$(pixel posn)

Upper bound(pixel posn)=average_intensity(pixel posn)+SCALE*$std$(pixel posn)

For each pixel position the average intensity of pixels at the position in each image that are within these bounds may be determined to create a mask. Pixels that are not within these bounds do not contribute to the flat field correction, since they are likely to relate to a particle, or are spurious for some other reason. The mask may be determined according to the following pseudocode:

```
For all positions in x,y
   For images in stack z
      If Lower bound <= pixel(x,y,z) <= Upper bound
      pixel_average += pixel(x,y,z)
      Count++
   End for
   Mask(x,y) = pixel_average/count
   Average_mask_intensity += mask(x,y)
End for
Average_mask_intensity /= image_size
```

The average mask intensity is the sum of all the mask intensities divided by the number of pixels in a single image. The final flat field correction mask may be determined by dividing this average intensity by the mask intensity:

correction_mask($x,y$)=average_mask_intensity/mask($x,y$).

Flat field correction as described above may also be used in the method described in FIG. 1 (although it is less likely to be usefully applied to an image region).

Referring back to FIG. 2, the next step in the example method is to process the image with an edge preserving filter. This is not essential, but reduces noise in the captured image, which is helpful in avoiding false detection of particles and particle boundaries. An example of a suitable edge preserving filter is a sigma filter. This takes a window around each pixel and identifies each other pixel within the window that has an intensity that is within sigma of the current pixel. The current pixel is then set to an average of all the pixels within the window that are within sigma of it.

Figure 4:
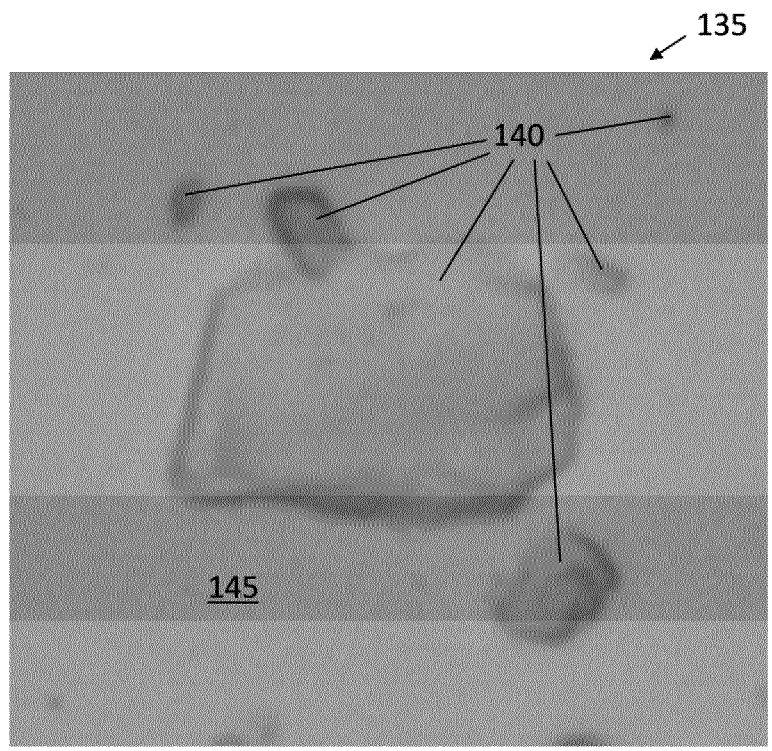
FIG. 4 is an image of a particle before an edge preserving sigma filter is applied.
Figure 5:
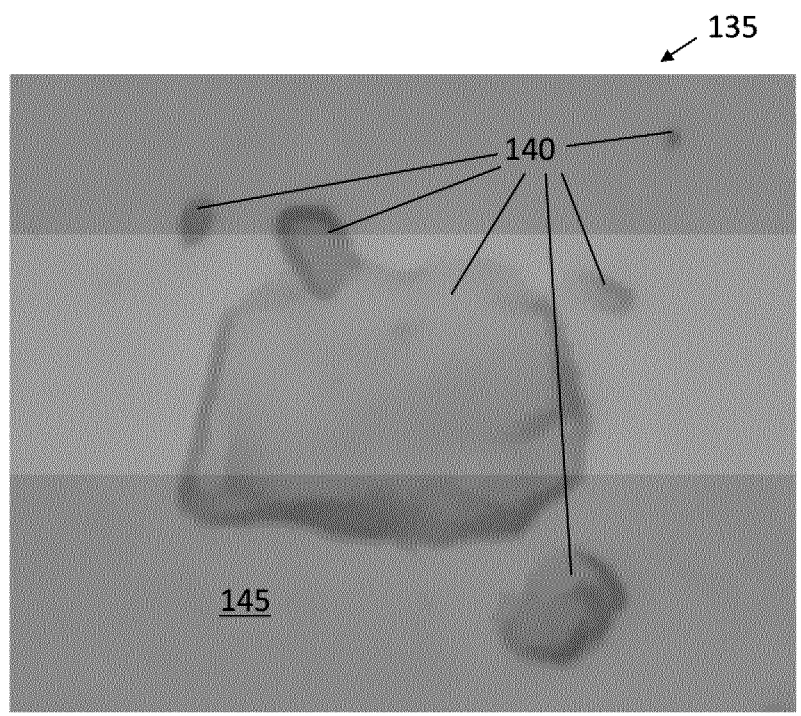
FIG. 5 is the image of FIG. 4 after an edge preserving sigma filter has been applied.

A square window, with a size of between 7 and 11 (i.e. 7 to 11 pixels across, with the current pixel in the middle), and a sigma of about 5 has been found to work well for low contrast images taken with an 18 megapixel camera with an 8 bit intensity depth. The operation of such a filter is illustrated in FIGS. 4 and 5, which respectively show a region 135 of a captured image before the sigma filter is applied, and after the sigma filter is applied. The particles 140 and their boundaries are preserved, but noise in the background 145 has been substantially reduced.

Referring back to FIG. 2, the next step 103 in the example method is to determine regions of interest in the captured image that may contain particles. As already discussed, a thresholding method may be used to do this, which may include any of the features discussed above with reference to intensity based methods for identifying boundaries.

In the present example, this comprises calculating the difference between the $95^{th}$ and $5^{th}$ percentile pixel intensities, and multiplying this difference by 0.8. The purpose is to generate a threshold which will capture all the particles and some noise which can later be rejected. The threshold could also be generated using Otsu's method, or any other appropriate method.

Figure 6:
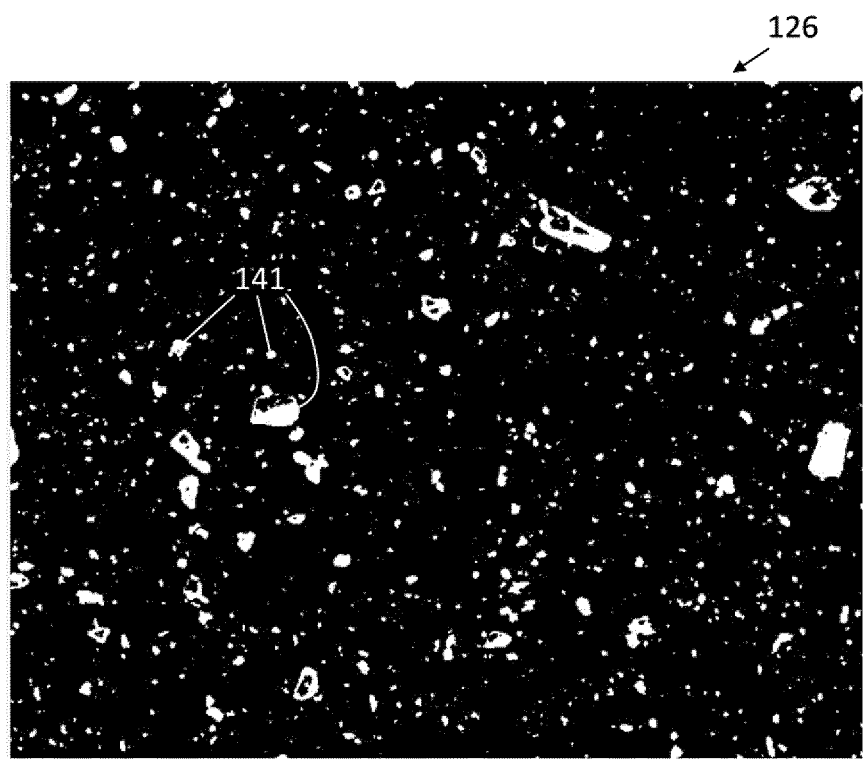
FIG. 6 is a binary mask created from a captured image, showing all the image features identified as corresponding with particles (based on a threshold intensity criteria)

This threshold is used to generate a logical image where pixels are labeled as a 'particle' if 'above' the threshold. FIG. 6 illustrates a logical image 126, where black represents pixels categorized as 'not-particle' and white represents pixels categorized as 'particle' 141, based on the threshold intensity.

Figure 7:
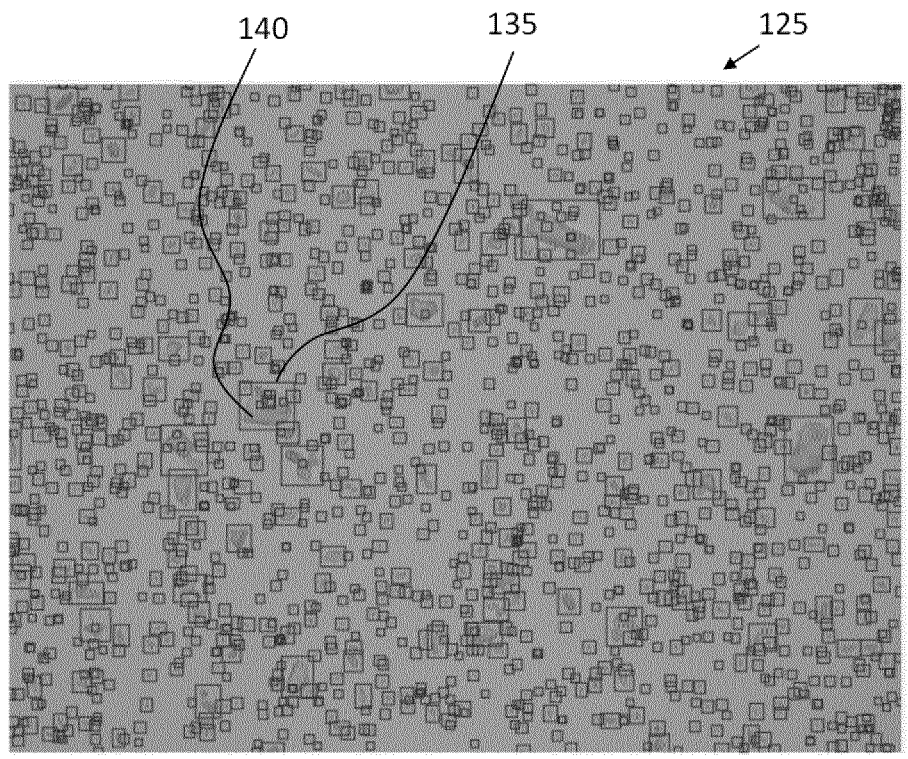
FIG. 7 is the captured image used to create FIG. 5, divided into regions of interest.

Referring to FIG. 7, regions of interest, indicated by boxes 135 can be defined by drawing bounding boxes around each contiguous 'particle' region of pixels. Each region of interest 135 may be larger than the bounding box, for example including a predetermined number of pixels in each direction away from the bounding box. Each of these regions of interest 135 can be treated separately and anything outside a region of interest may be discarded as no longer required.

Having created regions of interest (or image regions), some of these can be rejected as noise, as previously discussed. In the example method, the rejection criteria is based on the range of intensity in the image region. If the range of intensity, calculated as the difference between the $99^{th}$ and $1^{st}$ percentile of pixel intensity, is less than 1% of the $99^{th}$ percentile value of pixel intensity, the image region is rejected as noise. Rejecting image regions may improve the speed with which the captured image can be processed to identify particles.

Referring back to FIG. 2, each image region (or region of interest) is then separately processed 110, using an intensity method 111 and a gradient based method 112, to determine a first and second boundary as already described. The first and second boundary are then combined using an OR operator, also already described. The particle boundary in each image region is then determined from the combined boundary (for instance by discarding internal boundaries, and by closing gaps in the boundary).

Figure 11:
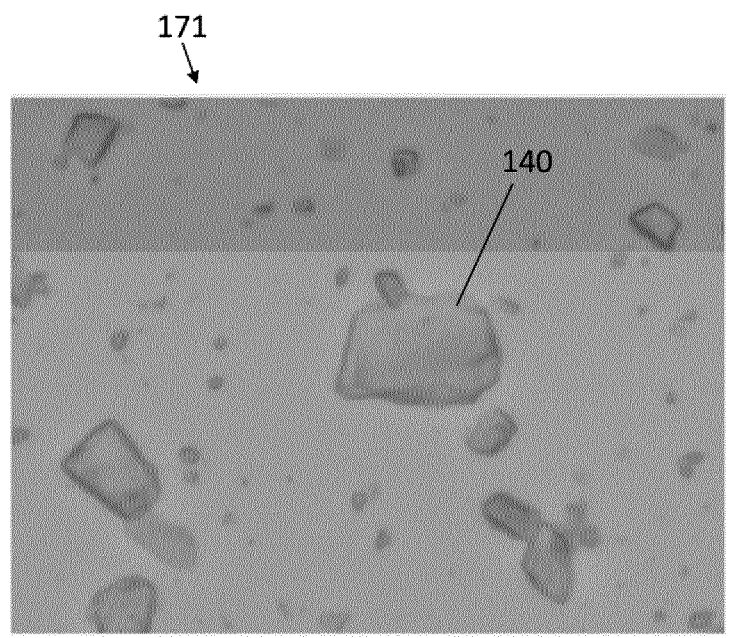
FIG. 11 is a region of a captured unprocessed image comprising particles.

This results in particle boundaries being determined for each region of interest in the captured image (or image frame). The particle boundaries determined in this way may be combined to produce a frame level image with all the particle boundaries present. A region of such a combined image is shown in FIG. 11, which is described in more detail later.

Figure 8:
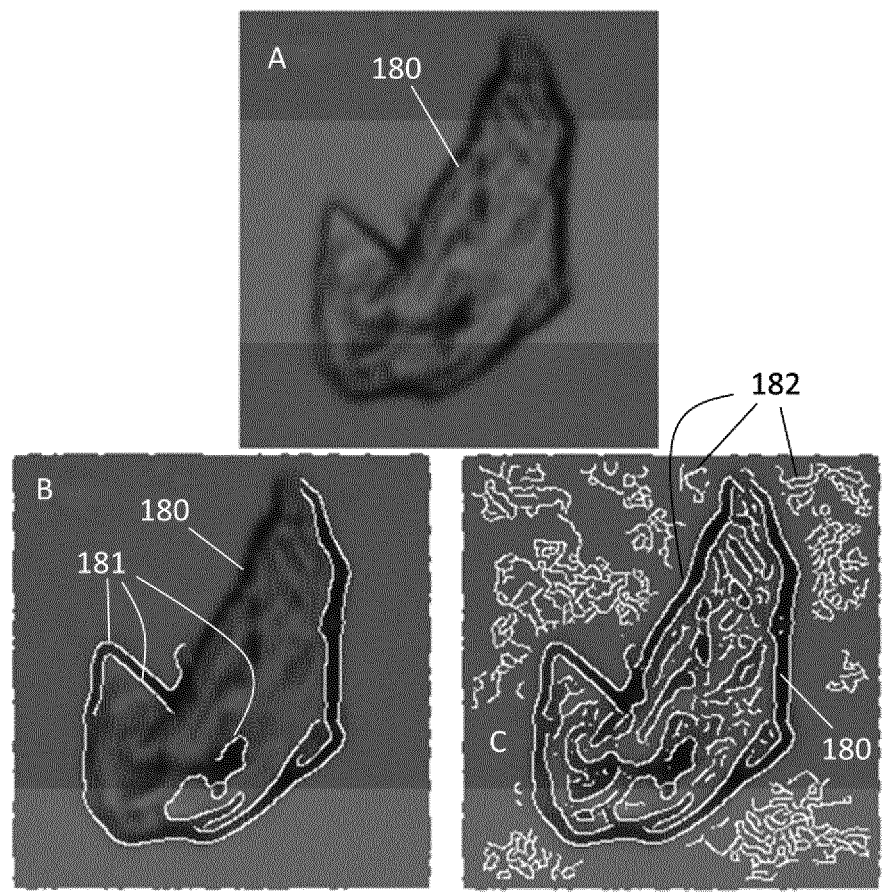
FIG. 8 is a set of images, showing: (A) a protein micrograph image; (B) the detected edges that result from applying an edge detection method with settings that undersegment; and (C) the detected edges that result from applying an edge detection method with settings that oversegment.

Referring to FIG. 8A, a micrograph image of a protein 180 is shown. In order to characterise the properties of the protein 180, it is desirable to accurately determine the boundary of the protein 180. Applying an edge detection method to this task (to determine the second boundary, as described above) can often result in the identification of too many boundaries (oversegmentation) or incomplete/too few boundaries (undersegmentation). FIG. 8B illustrates boundaries 181 obtained by applying a Canny edge detector to the image, with parameters (low and high threshold) that result in undersegmentation. FIG. 8C illustrates boundaries 182 obtained by applying a Canny edge detector to the image, with parameters that result in oversegmentation. It is difficult to determine fixed parameters for an edge detection method that are appropriate for the range of typical images that must be reliably segmented in the context of particle analysis.

The applicant has considered a number of different edge detection methods, and has found that Canny edge detection with adaptive thresholds (in which at least one threshold is determined with reference to the image) provides excellent results in the context of particle analysis. Most edge detection methods tend to result in oversegmentation of particle images. Watershed methods, for example, tend to result in oversegmentation, and zero-crossing methods (such as Marr-Hildreth) tend to return 'false edges'.

Of the available edge detection methods that are applicable, the applicant has identified that edge detection with adaptive thresholding is particularly advantageous in minimising spurious edge detection at the same time as providing flexibility in dealing with the wide range of contrast that may be associated with the image region of the particle. In particular, this method is able to accommodate the low contrast and mixed contrast samples at the same time as maintaining high performance for general samples, in which particle contrast tends to be high.

Low contrast sample of particular interest for particle analysis include biosimilars that may be used in pharmaceutical products, relating to insulin, human growth hormone, interferon, erythropoietin etc.

A full frame for analysis may include image regions corresponding with both high contrast and low contrast particles, and the method disclosed herein for segmentation allows both to be accommodated with particle boundaries identified with high reliability. A major contributor to this performance is the use of different segmentation parameters in each region of interest. Specifically, the combination of an adaptive threshold and an adaptive edge detection method (e.g. Canny's method, with thresholds adjusted based on the image region) has been found particularly advantageous.

Figure 9:
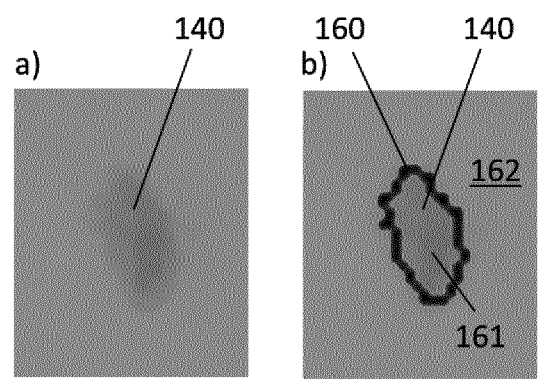
FIG. 9 is a) an image produced to identify edges using a gradient based method and b) the same image processing using an adaptive intensity threshold based method.

Referring to FIG. 9, an example is shown of boundaries that are determined using a gradient based method a) and using an intensity based method b). In this example the gradient based method is Canny edge detection, which fails to detect the low contrast edges of the particle 140. The intensity based method, which in this case is an adaptive thresholding method (as already described), correctly identifies the boundary 160 of the particle 140 by categorising pixels in the image as particle 161 and not-particle 162 based on a threshold intensity.

This illustrates how gradient and intensity based boundary detection may be complementary. In this example the combined boundary would simply be the first boundary, determined using the intensity based method.

Figure 10:
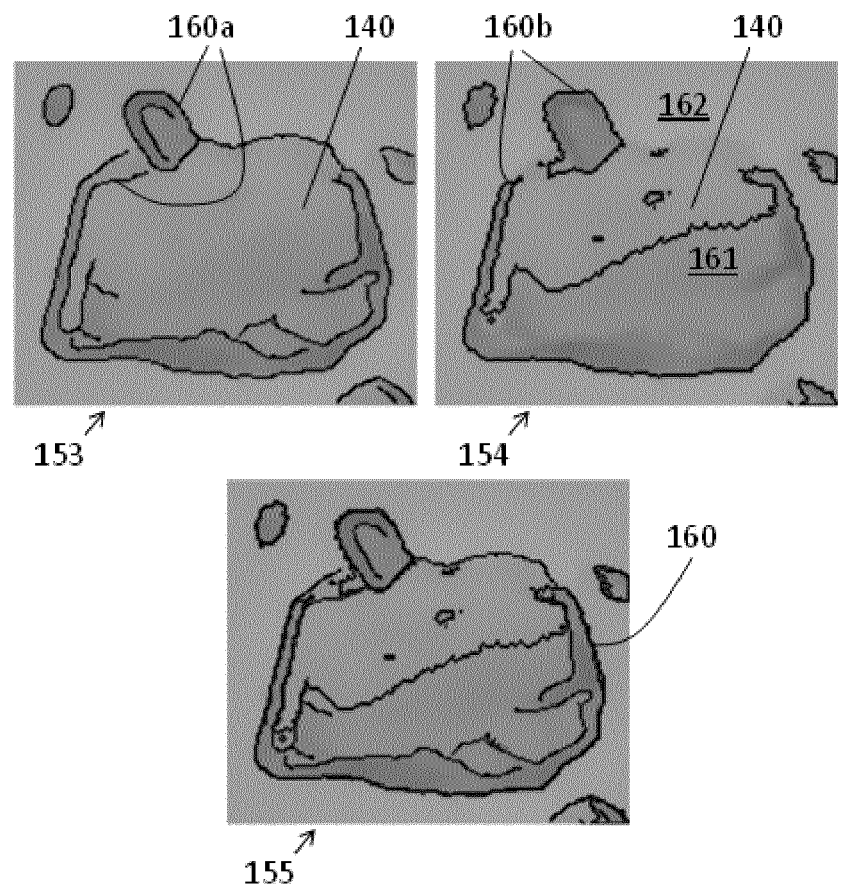
FIG. 10 illustrates the combination of boundaries obtained by an intensity method and a gradient method, showing how the detected edges are complementary, and produce a substantially accurate combined external particle boundary.

A further example of determining a combined boundary from a first and second boundary respectively determined using an intensity and gradient based method is shown in FIG. 10, which shows: a first image 153 processed using an intensity based method to determine a first boundary 160a; a second image 154 processed using a gradient based method to determine a second boundary 160b, and a third image 155 showing a combined boundary 160.

The first boundary 160a in this example is determined using an adaptive threshold method, as described above. The second boundary 160b in this example is determined using a Canny edge detection method. The combined boundary 160, as shown in the third image 155, includes pixels from the first boundary and from the second boundary (i.e. a logical OR of the first and second boundaries).

The combined boundary 160 may be further processed to determine a particle boundary, for instance by discarding internal boundaries, and performing a close operation to knit together any small openings that may be present in the combined boundary. As discussed above, the close operation may comprise using a 3×3 square structuring element (or 5×5 square structuring element).

Figure 12:
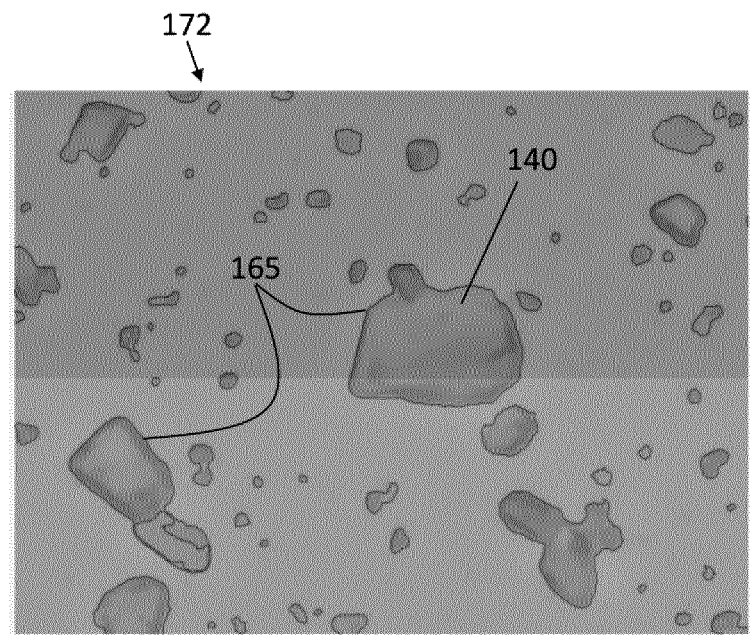
FIG. 12 shows the boundaries in the region shown in FIG. 10 obtained by processing the image in accordance with an embodiment.

The result of processing a captured image according to an example embodiment is illustrated in FIGS. 11 and 12, which respectively show a portion of a captured image before processing 171, and the same portion of the captured image after processing 172 to determine particle boundaries 165. The particle boundaries 165 are indicated in FIG. 12 with solid black lines.

Embodiments of the method disclosed herein allow boundaries of samples to be rapidly and reliably identified in images, even where the particles provide relatively low contrast in the image. The boundaries may be used to determine the features of the particles, such as their size and shape. A particle size distribution may be determined from the boundaries of particles, and presented to the user (e.g. in the form of a graph).

A non-volatile machine readable memory (e.g. CD-ROM) may be provided to configure a processor to perform the method.

Figure 13:
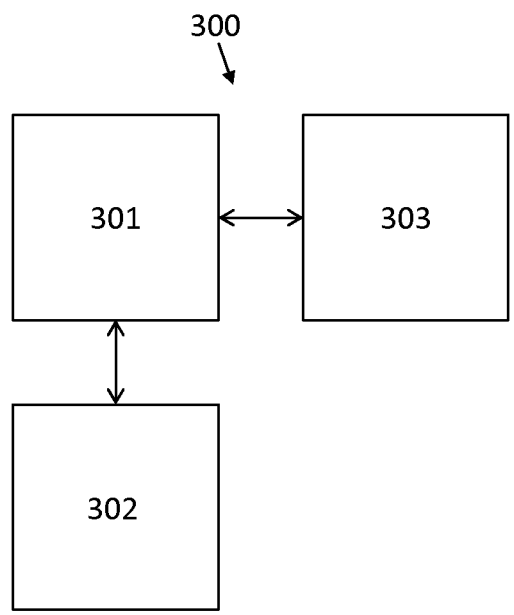
FIG. 13 is a schematic block diagram of an instrument according to an embodiment.

A particle characterisation instrument 300 according an embodiment is schematically illustrated in FIG. 13, comprising a processor 301, camera 302 and display 303. The processor 301 is configured to perform a method in accordance with an embodiment. The camera 302 is configured to obtain an image that includes particles and provide the image to the processor 301. The processor 301 processes the image in accordance with the method, and determines characteristics of the particles in the image (for example their shape or size, or the distribution of these features) from their boundaries. The processor 301 is configured to use the screen 303 to display the characteristics of the particles to the user.

The instrument 300 may be configured to present an array of thumbnail images to the user (e.g. on the display 303), each thumbnail comprising an image region, processed in accordance with an embodiment. The instrument 300 may be configured to present a summary of the characteristics of the particles, for example a particle size distribution, or mean and/or median values of parameters relating to shape and size.

The instrument 300 may be configured to allow a user to alter how the processing of images is performed to determine particle boundaries. For example, the user may be able to adjust threshold parameters, or to select a particular gradient based method.

The examples described herein are not intended to be limiting. The skilled person will appreciate that a number of other variations are possible, within the scope of the invention, which is determined by the appended claims.

The invention claimed is:

1. A method of determining a shape and/or size of particles by using a processor to identify a particle boundary of at least one particle in micrograph image, the method comprising:
   processing the image using an intensity based method to determine a first boundary corresponding with the at least one particle;
   processing the image using a gradient based method to determine a second boundary corresponding with at the least one particle;
   combining the first boundary and second boundary to create a combined boundary;
   determining a particle boundary of the at least one particle using the combined boundary;
   determining a shape and/or size of the at least one particle from the particle boundary of the at least one particle.

2. The method of claim 1, wherein the intensity based method is an adaptive thresholding method, in which a threshold value is determined or modified based on the image.

3. The method of claim 2, wherein the adaptive thresholding method comprises:
measuring a range of intensity in the image; determining the threshold value with reference to a percentage of the range of intensity in the image.

4. The method of claim 3, wherein the adaptive thresholding method comprises determining an upper and lower percentile of pixel intensities, and then determining the threshold value using the difference between the upper and lower percentile.

5. The method of claim 4, wherein the upper percentile is a percentile between the 80th percentile and 99th percentile, and/or the lower percentile is a percentile between the 1st percentile and 20th percentile.

6. The method of claim 1, wherein the gradient based method is Canny's edge detector.

7. The method of claim 6, wherein a low threshold and/or a high threshold for Canny's edge detector is determined with reference to the image.

8. The method of claim 7, wherein the low threshold is determined with reference to a standard deviation of an intensity of the image, and the upper threshold is a multiple of the lower threshold.

9. The method of claim 1, comprising performing a close operation on an image comprising the combined boundary.

10. A method of determining a shape and/or size of particles by using a processor to identify a particle boundary of at least one particle in a captured micrograph image, the method comprising:
processing the captured image to identify image features that correspond with particles;
identifying regions of interest in the captured image, each region of interest comprising at least one identified image feature that corresponds with a particle;
extracting at least one image region from the captured image, each image region being smaller than the captured image and corresponding with a region of interest;
using a processing method on each image region to determine the particle boundary of at least one particle;
determining a shape and/or size of the at least one particle from the particle boundary of the at least one particle.

11. The method of claim 10, further comprising correcting for illumination variation by performing a flat field correction before the step of processing the captured image to identify image features that correspond with particles.

12. The method of claim 11, comprising applying a rejection criteria to determine whether each image region should be processed according to determine a particle boundary, to remove image regions which are not likely to include a particle.

13. The method of claim 12, further comprising processing the captured image using an edge preserving filter, such as a sigma filter, before processing the captured image to identify image features that correspond with particles.

14. The method of claim 10, wherein processing the captured image to identify image features that correspond with particles comprises applying a threshold operation, to identify image features based on an intensity threshold.

15. An instrument for determining the shape and/or size of particles, comprising a processor configured to identify a particle boundary of at least one particle in a micrograph image by:
processing the image using an intensity based method to determine a first boundary corresponding with the at least one particle;
processing the image using a gradient based method to determine a second boundary corresponding with at the least one particle;
combining the first boundary and second boundary to create a combined boundary;
determining a particle boundary of the at least one particle using the combined boundary;
determining a shape and/or size of the at least one particle from the particle boundary of the at least one particle.

16. A machine readable non-volatile memory comprising instructions for configuring a processor to perform a method of identifying a particle boundary of at least one particle in a micrograph image, the method comprising:
processing the image using an intensity based method to determine a first boundary corresponding with the at least one particle;
processing the image using a gradient based method to determine a second boundary corresponding with at the least one particle;
combining the first boundary and second boundary to create a combined boundary;
determining a particle boundary of the at least one particle using the combined boundary
determining a shape and/or size of the at least one particle from the particle boundary of the at least one particle.

* * * * *